United States Patent [19]

Odorici

[11] Patent Number: 4,741,458
[45] Date of Patent: May 3, 1988

[54] PLASTIC CUP DISTRIBUTOR

[75] Inventor: Franco Odorici, Bologna, Italy

[73] Assignee: Azionaria Costruzoni Macchine Automatiche A.C.M.A. S.p.A., Bologna, Italy

[21] Appl. No.: 880,779

[22] Filed: Jul. 1, 1986

[30] Foreign Application Priority Data

Jul. 22, 1985 [IT] Italy ................... 3510 A/85

[51] Int. Cl.⁴ ............................................. B65H 3/08
[52] U.S. Cl. ................................. 221/221; 221/224; 221/278; 221/297
[58] Field of Search ............... 221/221, 223, 224, 278, 221/297, 298, 289, 251

[56] References Cited

U.S. PATENT DOCUMENTS

| | | | |
|---|---|---|---|
| 1,666,008 | 4/1928 | Graffenberger | 221/221 |
| 2,620,076 | 12/1952 | Bongiovanni, Jr. | 221/221 |
| 2,738,899 | 3/1956 | Hansen et al. | 221/278 |
| 3,099,120 | 7/1963 | Bruun | 221/298 |
| 3,278,078 | 10/1966 | Kister | 221/251 |
| 3,591,047 | 7/1971 | Buhle | 221/278 |
| 4,418,837 | 12/1983 | Kontz | 221/278 |

FOREIGN PATENT DOCUMENTS 8005802  5/1982  Netherlands ................. 221/278

Primary Examiner—H. Grant Skaggs
Attorney, Agent, or Firm—Cohen, Pontani & Lieberman

[57] ABSTRACT

The distributor separates plastic cups (3) which are provided with outwardly-facing rims (5) from a stack (2) in a store (1) and releases them one-at-a-time into a tube (6). The distributor comprises first, lower supports (13) and second, upper supports (14) arranged peripherally of the cups and separated by less than the distance between the rims (5) of the two adjacent cups. The supports (13 and 14) alternate in operative positions in which they support rims (5) of cups so that cups are released one-at-a-time and fall into the tube (6). The distributor also comprises compressed air blowers (25) which operate when the second supports (14) move into their operational positions to exert a pressure between the cup supported by the second supports (14) and the cup which has just ceased to be supported by the first supports (13).

11 Claims, 1 Drawing Sheet

U.S. Patent
May 3, 1988
4,741,458
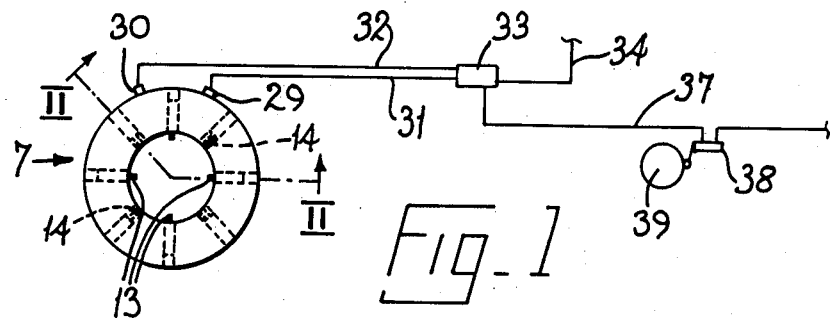
Fig_1
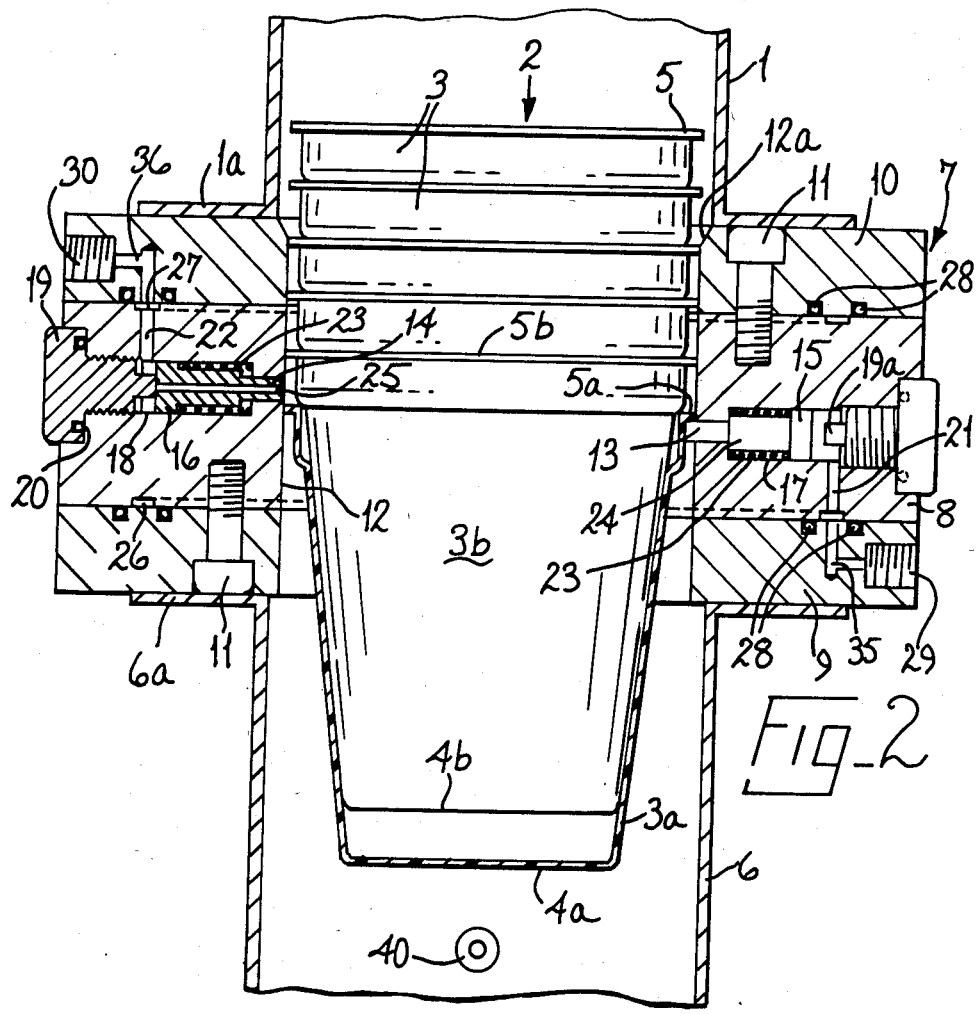
Fig_2

PLASTIC CUP DISTRIBUTOR

BACKGROUND OF THE INVENTION

The present invention is concerned with a plastic cup distributor, for example of the type used for measuring cups for powder detergents.

Cups of this type are, for example, supplied to the distributor of a powder detergent packaging plant and are usually stacked with each cup inserted into the next cup in the stack. The function of the distributor is to separate a cup from the stack when necessary and to supply it to a processing station.

In the case of packaging plants, a cup is intended to be inserted into each detergent container. It is evident, therefore, that the distributor has to operate at the same speed as the container filling speed which has nowadays reached a very high speed.

The distributors with which packaging plants have been equipped up to the present do not always manage to separate a cup from the stack and thus cause problems in high speed production.

Present distributors have a separation station which is disposed between a store for the stack of cups and a tube arranged below the store for removing one cup at a time. At the separation station there are first and second supports for the rims of the cups. The supports are disposed at two different levels whose spacing is slightly less than spacing between the rims of two adjacent cups in the stack. The first and the second supports do not operate simultaneously but alternate with one another. Usually a plate-like component forms both the first supports, i.e. the supports disposed at a lower level, and the second supports, at mutually offset positions on the plate. The plate intersects the mutual vertical alignment of the store and the tube in a transverse direction and is moved in an alternating manner transversely. Thus, when the first supports are operative, the stack is supported by the end cup which is supported by the first supports. When the first supports are moved to their inoperative position and the second supports are moved to their operative position, the end cup of the stack is released and the remainder of the stack is supported on the second supports. The end cup of the stack is thus separated from the others and falls down the removal tube under the action of gravity. When the second supports are moved to their inoperative position and the first supports are moved to their operative position, the stack moves down until the cup which is now at the end of the stack is supported by the first supports so that the stack is again supported by the first supports. However, it is found that gravity alone is sometimes not sufficient to cause the end cup to drop down the tube because the cup is very light, thin and very deformable and therefore may not fall as desired.

It is an object of the present invention to provide a distributor for plastic cups which achieves separation of one cup at a time from a stack in a positive and reliable manner, the distributor being capable of operating at high speeds and being of simple construction.

BRIEF SUMMARY OF THE INVENTION

The invention provides a distributor for plastic cups which are provided with outwardly-facing rims and are arranged to form a stack in a store and to be released one at a time into a tube, the store being disposed above the tube and being separated therefrom by a separation station at which cups are separated from the stack, the distributor comprising first, lower, supports and second, upper, supports at the separation station, the supports being arranged peripherally with respect to the cups and the first supports being separated from the second supports by a distance which is less than that between the rims of two adjacent cups in the stack, the first and the second supports beng movable between respective operational and non-operational positions and being arranged to alternate with one another in their operational positions to provide support for the stack by providing support for a rim of a cup, the distributor also comprising compressed air blowers at a level between the first and the second supports, the blowers being operational when the second supports move into their operational positions to exert a pressure between the cup supported by the second supports and the cup which has just ceased to be supported by the first supports.

In a distributor in accordance with the last preceding paragraph, the operation of the air blowers achieves positive and reliable separation of the end cup from the stack as the end cup is forced down the tube by the pressure created by the blowers.

The distributor may comprise, at the separation station, an annular body whose central aperture provides communication between the store and the tube. The blowers and first and second supports may be mounted in this body distributed around its central aperture, each of the supports being formed by a projection which is movable between a non-operational position in which it is retracted into the body and an operational position in which it projects into the central aperture. Each of the projections may be formed as the piston rod of a piston and cylinder assembly whose cylinder extends radially in the body. The piston of each piston and cylinder assembly may be arraned to be moved so that the projection moves into its operational position by the introduction of fluid, e.g. compressed air, under pressure into the cylinder and to be moved so that the projection moves into its non-operational position by the action of a spring.

Each of the compressed air blowers may comprise a passage passing through one of the second supports. Thus, the compressed air enters the space immediately below the rim of a cup supported by the second supports. Where the supports are formed by projections formed as piston rod of a piston and cylinder assembly as aforementioned, each of the blowers may comprise a passage passing through one of the projections forming the second supports and the piston of which the projection forms a piston rod. In this case, air under pressure introduced into the cylinder serves not only to move the projections to their operational positions but also as the compressed air which separates the cup.

Where the supports are formed as projections formed as the piston rod of a piston and cylinder assembly, the piston and cylinder assemblies associated with the first support may be annularly offset from those associated with the second supports, and the cylinders of the assemblies associated with the first supports may communicate with a space formed between the lower surface of the annular body and an annular disc secured to the body, and the cylinders of the assemblies associated with the second supports may communicate with a space formed between an upper surface of the body and a further annular disc secured to the body, the spaced being alternately connected to a source of compressed air and the atmosphere.

BRIEF DESCRIPTION OF THE DRAWINGS

There now follows a detailed description, to be read with reference to the accompanying drawings, of a preferred embodiment of the invention.

In the drawings:

FIG. 1 is a diagrammatic plan view of the preferred distributor; and

FIG. 2 is a vertical cross-sectional view taken on the line II—II in FIG. 1 but on a larger scale.

DETAILED DESCRIPTION OF PREFERRED EMBODIMENT OF THE INVENTION

The distributor shown in the drawings is for plastic cups 3 which are provided with outwardly-facing rims 5 and are arranged to form a stack 2. The cups have a frusto-conical shape and are nested one inside the other so that the stack 2 contains a high number of plastic cups inserted inside one another. The distributor comprises a store whose lower end portion is indicated by 1 and which is formed by a cylindrical tube having a vertical axis. The stack 2, thus, extends coaxially upwardly in the store. The cups are comparatively thin and light and are of the type used as measures for powder detergents. The lowermost cup of the stack 2 is indicated by 3a, whilst the penultimate cup is indicated by 3b.

Preferably, but not essentially, the cups have their bases facing downwardly in the stack. The base of the lowermost cup is indicated by 4a and that of the penultimate cup by 4b. The cups become wider towards their mouths, which are cylindrical and terminate in the rims 5 which face outwardly. Consequently, between the rims 5 of two adjacent cups in the stack there is a small space. The internal diameter of the store is slightly greater than the maximum diameter of the cups, i.e. their diameter at the rim 5.

The distributor also comprises a tube 6 for removing one cup at a time. The store is disposed above the tube 6 and is separated therefrom by a separation station 7 at which cups are separated from the stack 2. The separation station 7 is formed by an assembly of annular components, viz. a central body 8 and two discs 9 and 10. The discs 9 and 10 are secured by screws 11 against the lower surface and the upper surface respectively of the body 8. The lowermost portion of the store 1 and the tube 6 at its uppermost end are provided with flanges 1a and 6a respectively which are secured to the discs 9 and 10. The assembly of annular components 8, 9, 10 has a central aperture 12 which provides communication between the store 1 and the tube 6. The diameter of the aperture 12 is substantially equal to that of the rim 5 of the cups. The diameter of the aperture 12 is thus less than the internal diameter of the store 1 and a tapering surface 12a is provided in the disc 10 to accommodate this difference in diameters.

The distributor also comprises first, lower, supports 13 and second, upper, supports 14 at the separation station 7. These supports 13 and 14 are provided peripherally of the cups 3 and, as will become apparent, provide alternating support for the rim 5 of a lowermost cup in the stack 2. Each of the supports 13 and 14 is formed by a projection which is movable between a non-operational position in which it is retracted into the body 8 and an operational position in which it projects into the central aperture 12. There are four supports 13 and four supports 14 distributed peripherally of the cups 3, the stops 13 being annularly offset from the stops 14 (See FIG. 1). The first 13 and second 14 supports are movable between respective operational and non-operational positions and are designed to alternate with one another in their operational positions to provide support for the stack by providing support for a rim 5 of a cup 3. The first supports 13 are separated from the second supports 14 vertically by a distance which is slightly less than that between the rims 5 of two adjacent cups in the stack 2. The distributor also comprises, as explained below, compressed air blowers located at the station 7 which are also peripherally arranged to the cups 3 and operate when the second supports 14 move into their operational positions so that the blowers exert a pressure between the cups supported by the second supports 14 and the cup which has just ceased to be supported by the first supports 13.

Each of the projections which forms the supports 13 and 14 is formed as the piston rod of a piston and cylinder assembly comprising a piston (15 in the case of the supports 13 and 16 in the case of the supports 14) and a cylinder (17 in the case of the supports 13 and 18 in the case of the supports 14). The cylinders 17 and 18 are formed by radial bores in the body 8. These bores are closed towards the exterior of the body 8 by screw caps 19 whose heads act as sealing gaskets 10 and whose shank ends terminate in end portions 19a of reduced diameter. The pistons 15 and 16 abut the end portions 19a when they are in their retracted position with the projections in their non-operational positions. The end portions 19a serve to keep an annular space in the cylinders free for the entrance of compressed air into the cylinders. These annular spaces are entered by conduits (21 in the case of the cylinders 17 and 22 in the case of the cylinders 18). The piston and cylinder assemblies 15,17 and 16 18 are of the single-acting pneumatic type. Thus, when air under pressure is introduced into the conduits 21 and 22 the pistons 15 and 16 are moved. The return stroke of the pistons takes place as a result of the action of helical springs 23 which are located in the cylinders 17 and 18 closer to the aperture 12 than the pistons 15 and 16. The projections which form the support 13 and 14 have a section 24 of larger diameter which is within the cylinder 17 or 18 and around which the springs 23 extend. This section 24 forms a shoulder on the projections which form the supports 13 and 14 which abuts the inner end of the cylinders 17 and 18 and limits the movement of the supports into the aperture 12. A passage is provided between the cylinders 17 and 18 and the aperture 12 for the passage of the projections forming the supports 13 and 14, this passage being of smaller diameter than the section 24.

Each of the above mentioned compressed air blowers is formed by a passage 25 which passes axially through the piston 16 and the projection of each of the supports 14. There are thus four compressed air blowers. Each passage 25 has a downwardly-directed exit within the aperture 12.

The conduits 21 and 22 extend vertically within the body 8, the conduit 21 extending vertically downwardly from the cylinders 17 and the conduits 22 extending vertically upwardly from the cylinders 18. The conduits 21 are connected to an annular space 26 formed between a lower surface of the body 8 and the disc 9, and the conduits 22 are connected to an annular space 27 formed between an upper surface of the body 8 and the annular disc 10. The spaces 26 and 27 are sealed by annular gaskets 28 clamped beteen the body 8 and the discs 9 and 10. The spaces 26 and 27 are alternately connected to a source of compressed air and the atmosphere. To connect the spaces 26 and 27 as aforesaid, the disc 9 defines a fitting 29 for a tube 31 and the disc 10 defines a fitting 30 for a tube 32. The tubes 31 and 32 are connected to an electrical switching valve 33. A tube 34 which leads to a source of compressed air is also connected to the valve 33 as is a port to the atmosphere (not shown). The fittings 29 and 30 are connected to the respective spaces 26 and 27 by a passage 35 in the disc 9 and a passage 36 in the disc 10. An electrical cable 37 is connected to the valve 33 and supplies electrical signals to the valve which cause it to connect the tube 34 and the port to the atmosphere alternately to the tubes 31 and 32. The electrical signals come from a microswitch 38 which is operated by a cam 39 which monitors the cycle of the automatic plant which is using the cups 3, for example a plant for packaging powdered detergents into boxes. A sensor 40 is provided in the tube 6 at a suitable distance from the separation station 7 and monitors cyclically the separation of cups from the stack 2 so that if no cup passes the sensor this is indicated and corrective action can be taken.

The operation of the distributor will now be described. When the lower supports 13 are in their operational position, the rim 5a of the lowermost cup 3a and consequently the whole stack 2 is supported thereon. The compressed air from the tube 34 is connected via the tube 31 to the cylinders 17 so that the supports 13 are retained in their operational position. Meanwhile, the supports 14 are held in their non-operational positions by the springs 23 in the cylinders 18 as the cylinders 18 are connected via the tube 32 to port to the atmosphere. When the cam 39 causes switching the valve 33, the cylinders 17 are connected via the tube 31 to port to the atmosphere and the springs 23 in the cylinder 17 cause the supports 13 to be moved to their non-operational positions. At the same time, the cylinders 18 are connected via the tube 32 to the tube 34 to the source of compressed air and operate to move the supports 14 into their operational positions against the action of the springs 23 in the cylinders 18. The retraction of the supports 13 releases the rim 5a of the lowermost cup 3a but the movement of the supports 14 into their operational position causes them to support the rim 5b and the remainder of the stack. As soon as the pistons 16 begin their movement towards the aperture 12. The compressed air supplied to the cylinders 18 can enter the passage 25 and flow into the aperture 12 therethrough. Thus, compressed air emerges from the passages 25 and exerts a pressure between the cups 3b and 3a with the result that the cup 3a is caused to separate from the stack 2 and fall into the tube 6 in a positive and reliable manner. When the valve 33 is next switched, the supports 14 are retracted and the compressed air blowers no longer operate and the supports 13 are moved into their operational positions. As this happens, the stack 2 moves downwardly so that it is again supported on the supports 13.

Various modifications and variations of the distributor described above are possible. For example, the single-acting piston and cylinder assemblies associated with the supports 13 may have the arrangement of the spring 23 and the conduits 21 reversed so that the supports are spring urged into their operational positions and are moved into their non-operational positions by the action of the compressed air. This arrangement would ensure that if the supply of compressed air fails for any reason, the stack would be prevented from falling into the tube 6. It would also be possible to reverse the arrangement of the springs 23 in the cylinders 18 and the conduits 22. Furthermore, the piston and cylinder assemblies may be of the double-acting type. Another possibility is to provide the store 1 and the tube 6 with longitudinal apertures.

What is claimed is:

1. A distributor for plastic cups which are arranged to form a stack in a store and to be released one at a time into a tube, each of said cups including a sidewall having a circumferential top portion defining a substantially planar opening and a rim which projects substantially parallel to the plane of and radially outwardly from the opening of the cup, the store being disposed above the tube and being separated therefrom by a separation station at which cups are separate from the stack, the distributor comprising first, lower, supports and second, upper, supports at the separation station, the supports being arranged peripherally with respect to the cups and the first supports being separated from the second supports by a distance which is less than that between the rims of two adjacent cups in the stack, the first and the second supports being movable between respective operational and non-operational positions and being arranged to alternate with one another in their operational positions to provide support for the stack by providing support for a rim of a cup, the distributor also comprising compressed air blowers at a level between the first and the second supports, the blowers being operational when the second supports move into their operational positions to exert a downwardly-directed pressure against the radially-outwardly projecting rim of a first cup which has just ceased to be supported by the first supports so that said first cup is driven by said pressure against its rim in a downward direction to separate said first cup from a second cup supported by said second supports.

2. A distributor according to claim 1, comprising, at the separation station, an annular body whose central aperture provides communication between the store and the tube, the blowers and the first and second supports being mounted in this body distributed around its central aperture, each of the supports being formed by a projection which is movable between a non-operational position in which it is retracted into the body and an operational position in which it projects into the central aperture.

3. A distributor according to claim 2, wherein each of the projections is formed as the piston rod of a piston and cylinder assembly whose cylinder extends radially in the body.

4. A distributor according to claim 3, wherein the piston of each piston and cylinder assembly is arranged to be moved so that the projection moves into its operational position by the introduction of fluid under pressure into the cylinder and to be moved so that the projection moves into its non-operational position by the action of a spring.

5. A distributor according to claim 3, wherein each of the blowers comprises a passage passing through one of the projections forming the second supports and the piston of which the projection forms a piston rod.

6. A distributor according to claim 5, wherein the piston and cylinder assemblies associated with the first supports are angularly offset from those associated with the second supports, and the cylinders of the assemblies associated with the first supports communicate with a space formed between a lower surface of the body and an annular disc secured to the body, and the cylinders of the assemblies associated with the second supports communicate with a space formed between an upper surface of the body and a further annular disc secured to the body, the spaces being alternately connected to a source of compressed air and the atmosphere.

7. A distributor according to claim 3, wherein the piston and cylinder assemblies associated with the first supports are angularly offset from those associated with the second supports, and the cylinders of the assemblies associated with the first supports communicate with a space formed between a lower surface of the body and an annular disc secured to the body, and the cylinders of the assemblies associated with the second supports comunicate with a space formed between an upper surface of the body and a further annular disc secured to the body, the spaces being alternately connected to a source of compressed air and the atmosphere.

8. A distributor according to claim 1, wherein each of the blowers comprises a passage passing through one of the second supports.

9. A distributor according to claim 8, wherein the passages have a downwardly-directed exit.

10. A distributor for plastic cups which are provided with outwardly-facing rims and are arranged to form a stack in a store and to be released one at a time into a tube, the store being disposed above the tube and being separated therefrom by a separation station at which cups are separated from the stack;

the distributor comprising at the separation station an annular body whose central aperture provides communication between the store and the tube, the blowers and the first and second supports being mounted in this body distributed around its central aperture, each of the supports being formed by a projection which is movable between a non-operational position in which it is retracted onto the body and an operational position in which it projects into the central aperture;

the projections being formed as the piston rod of a piston and cylinder assembly whose cylinder extends radially in the body;

the piston and cylinder assemblies associated with the first supports being angularly offset from those associated with the second supports, and the cylinders of the assemblies associated with the first supports communicate with a space formed between a lower surface of the body and an annular disc secured to the body, and the cylinders of the assemblies associated with the second supports communicate witha space formed between an upper surface of the body and a further annular disc secured to the body, the spaces being alternately connected to a source of compressed air and the atmosphere;

the distributor comprising first, lower, supports and second, upper, supports at the separation station, the supports being arranged peripherally with respect to the cups and the first supports being separated from the second supports by a distance which is less than that between the rims of two adjacent cups in the stack, the first and the second supports being movable between respective operational and non-operational positions and being arranged to alternate with one another in their operational positions to provide support for the stack by providing support for a rim of a cup, the distributor also comprising compressed air blowers at a level between the first and the secomd supports, the blowers being operational when the second supports move into their operational positions to exert a pressure between the cup supported by the second supports and the cup which has just ceased to be supported by the first supports.

11. A distributor for plastic cups which are provided with outwardly-facing rims and are arranged to form a stack in a store and to be released one at a time into a tube, the store being disposed above the tube and being separated therefrom by a separation station at which cups are separated from the stack;

the separation station comprising an annular body whose central aperture provides communication between the store and the tube, the blowers and the first and second supports being mounted in this body distributed around its central aperture, each of the supports being formed by a projection which is movable between a non-operational position in which it is retracted onto the body and an operational position in which it projects into the central aperture;

the projections being formed as the piston rod of a piston and cylinder assembly whose cylinder extends radially in the body;

the piston and cylinder assemblies associated with the first supports being angularly offset from those associated with the second supports, and the cylinders of the assemblies associated with the first supports communicate with a space formed between a lower surface of the body and an annular disc secured to the body, and the cylinders of the assemblies associated with the second supports communicate with a space formed between an upper surface of the body and a further annular disc secured to the body, the spaces being alternately connected to a source of compressed air and the atmosphere;

the distributor comprising first, lower, supports and second, upper, supports at the separation station, the supports being arranged peripherally with respect to the cups and the first supports being separated from the second supports by a distance which is less than that between the rims of two adjacent cups in the stack, the first and the second supports being movable between respective operational and non-operational positions and being arranged to alternate with one another in their operational positions to provide support for the stack by providing support for a rim of a cup, the distributor also comprising compressed air blowers at a level between the first and the second supports, the blowers being operational when the second supports move into their operational positions to exert a pressure between the cup supported by the second supports and the cup which has just ceased to be supported by the first supports;

each of the blowers comprising a passage passing through one of the projections forming the second supports and the piston of which the projection forms a piston rod.

* * * * *